March 14, 1933.  E. R. BURTNETT  1,901,283
TRANSMISSION MECHANISM
Filed Oct. 23, 1931

Inventor
Everett R. Burtnett

Patented Mar. 14, 1933

1,901,283

UNITED STATES PATENT OFFICE

EVERETT R. BURTNETT, OF SAN MARINO, CALIFORNIA

TRANSMISSION MECHANISM

Application filed October 23, 1931. Serial No. 570,715.

This invention relates to transmission gearings designed for use on motor vehicles and has for its object first the obtaining of a composite embodiment of an overrunning drive clutch coupling device in a change speed gear set and the obtaining of an intermediate transmission structure for cooperation between the various driving elements of the change speed gearing and the overrunning drive coupling device, of a form, arrangement and relation with the differentiating speed gear drivers and the overrunning coupling device which will enable all forward speeds being operable selectively all overrunning, or all positive drive; second, to obtain in the above described composite construction, an intermediate transmission structure between alternative differentiating speed drivers and an overrunning coupling device in composite structural relation, which by its novel form, arrangement and relation therebetween permits, if desired, an application of rotation synchronizing mechanism for cooperation with alternative drivers of the two relatively next-in-ratio two top speed gears and a gear shift clutch member for selective engagement therewith for syncro-mesh engagement of either of the two top speed drive alternatives; and third, to obtain in the above described construction, a composite embodiment of means optionally operable for altering the relation between all forward speed gear drivers and the common final driven element from that of all gears overrunning drive, to that of all gears positive drive, and by the novel form and relation of this means with the reverse gear selecting gear member, affording that through the medium of which means a positive drive couple may be effected directly between reverse gearing of conventional design and the final driven element, which latter is in positive drive connection with the vehicle wheels, by shifting into reverse, whether the positive drive means is in position for overrunning drive relations between the transmission elements, or in position for positive gear drive relations between the transmission elements, and without necessitating either changing the position of the overrunning or positive drive selective means, which subsequently means the status of the transmission from overrunning to positive, without requisite for auxiliary parts, and without requiring reshifting the alternative overrunning or positive coupling means, to return the transmission to its preselected status, after use of reverse gear.

A still further object of this invention is, to obtain in the above described composite construction, a form combination and arrangement of transmission and overruning clutch drive intermediary structure in combination, arrangement and novel relation with customary alternative differentiating speed gear drives and final transmission means, which will permit the customary form of the main transmission shaft, disposing through the change speed gear set and selective overrunning or positive drive means, being in two aligned and relatively contiguously disposed parts. This construction, besides permitting of the next-in-ratio to top speed gear driven member being carried on the driven main shaft part, as customary, further obviates the requisite for a third aligned and relatively intermediately disposed main transmission shaft part found in other constructions devised for accomplishing selective, all speeds overrunning or all positive, operation. Further my improved construction is advantageous over other known constructions for accomplishing similar selective operation, in that the relation of the driven element beyond the overrunning coupling device is changed from that of a third aligned tail shaft part remotely disposed relatively with the primary driving shaft part in other constructions devised for accomplishing similar selective overrunning or positive drive control, to that, in my construction, of a second aligned driven shaft part beyond the overrunning drive coupling device, but in contiguous relation with the primary driving shaft part. With the resultant advantage that, by my improved construction the single driven main transmission shaft part may be pilot journalled at its front end directly in the recessed end of the single other main transmission shaft part, being the primary driving part, as customary.

Thus it will be seen that I have provided novel means by which transmissions embodying customary practices of change speed gearing and shafting constructions may be manufactured to include, compositely, means for accomplishing selectively, all speeds overrunning drive for all speeds free wheeling, or all speeds positive drive for all speeds positive gear. Which enables the continuance of proven gearing structure without departing from practices with which the industry is experienced, and retains the highly efficient tried and proven organization of change speed gearing. Adding the desirable ability of the selective free wheeling or positive gear innovation, without incurring appreciable additional weight, or length of gear box, and being comparatively inexpensive of production.

Other objects and advantages of the invention will appear in the course of the following description, taken in connection with the accompanying drawing and appended claims.

Figure 1:
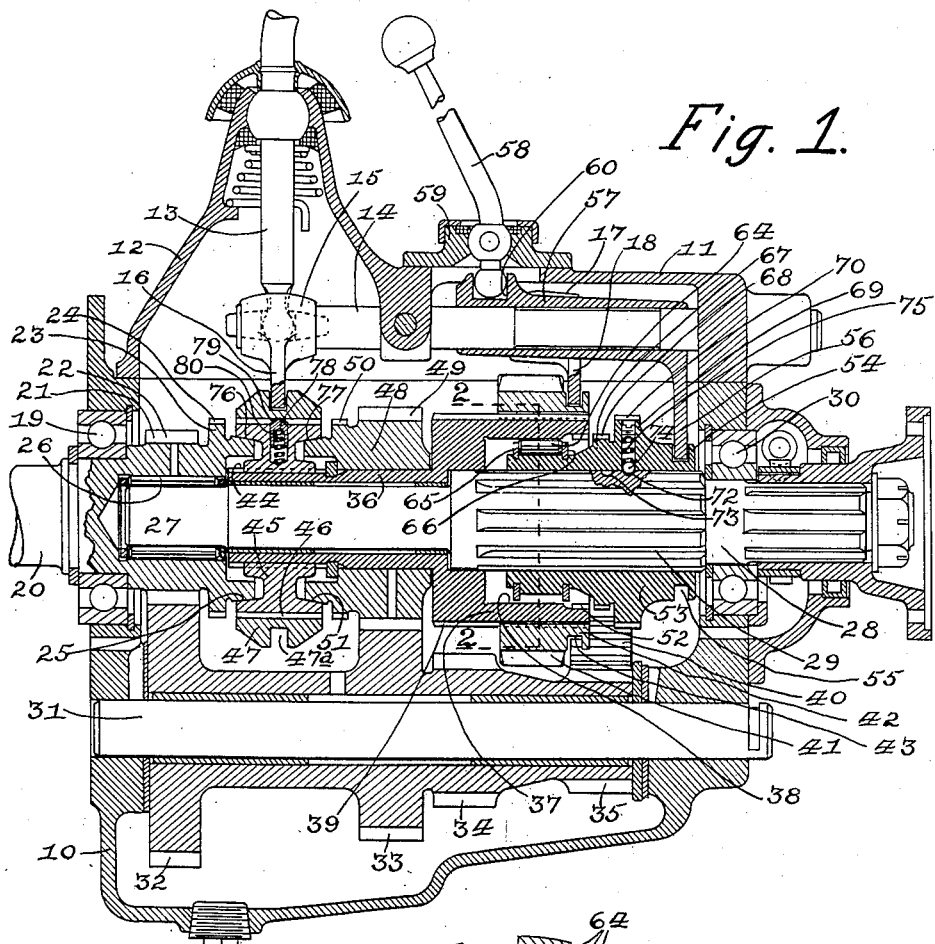
Figure 1 is a central longitiudinal sectional view of a transmission embodying my invention.
Figure 2:
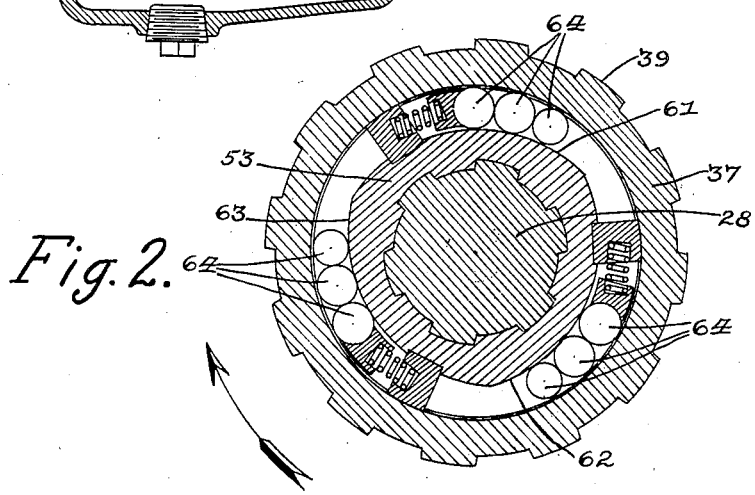
Figure 2 is a cross sectional view taken on line 2—2 of Figure 1.

Referring to the drawing, I illustrate in Figure 1 a casing 10 provided with a removable cover 11, having an upward extending portion 12 in which is universally journalled a gear shift lever 13. Longitudinally slidably mounted in the cover 11 is a sliding bar 14, and a second sliding bar (not shown) is disposed parallel thereto. A shifter 15 having a downward extending fork 16 is fixed on the bar 14, and a shifter 17 having a downward extending fork 18 is fixed on the second sliding bar. Since the structure thus far referred to is conventional, it is unnecessary to describe it in any greater detail.

Extending into the forward end of the casing 10 and journalled in a bearing 19 therein is a main drive shaft 20 driven directly from the engine through any suitable declutching mechanism, as customary. The end of the shaft 20 within the casing is enlarged to provide a gear 21 having teeth 22, and further is enlarged to provide a positive clutch flange 23 having dog teeth 24. The shaft 20 is further tapered at its driving end to provide a male cone surface 25 and still further is recessed to provide a pilot bearing 26, as customary. Journalled in the recessed end of the shaft 20 is the reduced front end 27 of a shaft 28 which is splined on its outer surface, as indicated at 29. The shaft 28 extends through the rearward end of the casing 10 and is rear journalled in a bearing 30 therein. as customary in transmission main driven shafts.

Journalled in the lower part of the casing 10 is a countershaft 31, on which are mounted four gears 32, 33, 34 and 35, decreasing in size progressively from front to rear. The four gears 32, 33, 34 and 35 are spaced from each other and are either formed as a unit, or splined to the shaft, as customary in transmission counter-shafts.

Rotatable on the shaft 28 is a loose concentric intermediate transmission sleeve 36 enlarged at its rearward end to provide a bell shaped portion 37 having a cylindrical recess 38 and which bell shaped portion is splined on its outer surface, as indicated at 39. A reverse idler gear 40 is arranged in juxtaposition to the countershaft gear 35 and in constant mesh therewith. Splined on the outer surface of the bell shaped portion 37 is a gear 41 formed with a hub 42 having a groove 43 adapted to receive the bifurcated end 18 of the shifter 17. The gear 41 is disposed between the counter-shaft 35 and the reverse idler gear 40 for selective engagement with one of these two gears.

The intermediate transmission sleeve member 36 is splined on the outer surface at its forward end, as indicated at 44. Splined on the forward end of the loose sleeve 36 is a gear shift clutch member of conventional form comprising a hub part 45 being splined on its outer surface, as indicated at 46, and a crown part 47 splined on the hub part 45. As customary, the crown part 47 is provided with a groove 47ª adapted to receive the bifurcated end of the shifter 15.

Rotatable on the loose sleeve 36, relatively between the hub part 45 of the gear shift clutch member and the enlarged bell shaped portion 37 thereof, is the customary coaxially arranged next-to-top speed gear driven gear member 48 having gear teeth 49, dog teeth 50 and a male cone portion 51. The gear member 48 is in constant mesh with the second from the front end counter-shaft gear 33, as customary in change speed transmissions.

Dog teeth 52 are formed on the bell shaped portion 37 of the loose transmission sleeve 36, preferably thereon at the rear and relatively open end of the cylindrical recess 38 thereof. Splined for axial movement on the shaft 28 in an overrunning clutch driven race member 53 having a reduced front end projecting within the cylindrical recess 38 of the bell shaped portion 37 of the loose transmission sleeve 36. This overrunning clutch driven member 53 is provided with a hub 54 having a groove 55 adapted to receive a bifurcated end 56 of a shifter 57, which latter is sleeved for relative longitudinal movement on the sliding bar 14.

An auxiliary shift lever 58 is journalled in the case cover 11, preferably by means of a journal box 59 removably secured to the top of the cover 11, and the shifter 57 is provided with a recess 60 adapted to receive the lower end of the auxiliary shift lever 58.

Cams 61, 62 and 63 are formed on the forward end of the overrunning clutch driven member 53, and clutch roller members 64 are disposed between the cams 61, 62 and 63 thereof and the cylindrical recess 38 of the bell shaped portion 37 of the loose sleeve member 36. Guard flanges 65 and 66 are provided for preventing relative axial movement between the roller clutch members 64 and the driven race member 53, and the roller clutch members 64 are adapted to slide longitudinally through the cylindrical recess 38 in engaged relation therewith, with axial movement of the driven race member 53.

The driven race member 53 is further formed with an enlarged portion 67 having dog teeth 68 adapted to be brought into engagement with the dog teeth 52 on the bell opening end of the intermediate transmission sleeve member 36 for locking the loose sleeve member 36 and the shaft 28 together whereby relative rotation therebetween will be positively prevented.

The driven race member 53 is further formed with a still greater enlarged portion 69 corresponding in external diameter with the external diameter of the bell portion 37 of the sleeve 36, and having splines 70 thereon corresponding with the splines, as indicated at 39, on the bell portion of the latter member, the shiftable driven race member 53 of the overrunning clutch is rendered engageable by the gear 41, by the internal splines of the latter member engaging the splines 70 on the former member, when the gear member 41 is shifted into engagement with the reverse idler gear 40.

To the accomplishment of positively coupling the reverse selecting gear member 41 to the driven shaft 28 when the former is shifted into mesh with the reverse gear 40, the splines 70 are relatively positioned on the shiftable overrunning clutch driven race member 53, so as they will overlap the teeth of the reverse idler gear 40 at all times, whether the member 53 is in the position, in which it is shown in Figure 1, for all forward speeds free wheeling drive of the vehicle, or whether it is in its farthest forward position and there in positive engagement with the bell shaped portion 37 of the intermediate transmission sleeve member 36 for all speeds positive gear drive. Whereby in shifting the gear member to its farthest rearward position it will become both splined coupled with the coaxial member 53, which is in turn splined secured nonrotatable on the transmission shaft 28, and gear meshed with the reverse idler gear 40, thus providing a positive transmission couple between the reverse driven gear member 41 and the transmission shaft 28, regardless of whether or not the transmission is in free wheeling or positive gear couple for forward speeds.

To insure that the shiftable driven race member 53 of the overrunning clutch unit will be held in either selected position respectively, in its farthest forward position for positive coupling engagement with the intermediate transmission sleeve member 36 for all speeds positive, or in its farthest rearward position (as shown) for all speeds free wheeling, two series of depressions 72 and 73 are formed in the surface of the shaft 28, and a series of ball members 74 are disposed in the shiftable member 43 whereof they will alternately seat in the respective depressions 72 or 73, with the alternate positioning of the member 53. A spring 75 is provided and adapted to act upon each ball member 74 to resiliently urge the ball to enter and remain in the depressions 72 and 73 until the member 53 is shiftably actuated under force.

As customary in some transmissions wherein syncro-mesh of direct drive and the relatively next-in-ratio gear to the direct drive is desired, the hubpart 45 of the direct and next-in-ratio gear selective drive clutch member, is provided with female cone surfaces 76 and 77 on opposite sides, which are respectively adapted to come into friction clutch engagement with the male cone surfaces 51, on the engageable gear member 48, and 25, on the drive shaft 20, before engagement between positive dental elements of the gear shift clutch and respective driver to be engaged takes place. The customary means for urging the hub part 45 to move axially with the actuated crown part 47, into friction engagement with the respective driver toward which the crown part 47 is being shifted, and thereafter to permit further movement of the crown part 47, exclusively, into positive engagement with the selected driver, is provided in the form of a series of plungers 78 disposed in the central wall of the hub part 45 and adapted to seat in depressions 79 formed in the internal diameter of the crown part 47, with a spring 80 provided to act resiliently upon each plunger 78 to urge it to seat in the depression 79, and thus cause the hub part 45 to be moved primarily in reverse axial directions with the crown part 47.

When the overrunning clutch driven race member 53 is in its farthest rearward position (as shown in Fig. 1) the couple between all forward speed gears and the driven shaft 28 is through the clutch roller members 64, through the medium of the sleeve member 36 acting as a primary all speeds driven member and as a driving race to the clutch roller members 64 of the overrunning clutch. Thus when the crown part 47 is in its farthest forward position the transmission will be in high gear (direct drive) free wheeling; when the crown part 47 is in its farthest rearward position the transmission will be in second gear (free wheeling); with the gear member 41 in its farthest forward position and in mesh with the counter-shaft gear 34, the transmission will be in first speed (low gear) free wheeling; and with the gear member 14 in its farthest rearward position and in gear mesh with the idler gear 40 and in spline couple with the overrunning clutch driven member 53, the transmission will be in positive reverse gear. Obviously with the overrunning clutch driven member 53 in its farthest forward position and in positive couple directly with the intermediary transmission sleeve member 36, the transmission will be in positive gear for any speed gear selected, as previously described in connection with the free wheeling couple.

To those familiar with the structure of conventional change speed gear sets which are at present most universally used, it will be readily seen that by my present invention the transmission can be manufactured to be operable selectively all speeds free wheeling or all positive, without change in form, combination or arrangement of the shafting and gearing structure, and to include compositely within the gear box, by my novel means, the optional free wheeling or positive drive ability under the selective form without additional over all length of the gear box. This being accomplished by the provision of an intermediary transmission member in the form of a loose member being sleeve concentrically over the customary driven main shaft part and this sleeve member being adapted to carry the differentiating speeds driven gear members and gear shift members and also to act as the driving race member to the overrunning clutch. The novel form of the intermediary sleeve member with a bell shaped portion, permitting the interpositioning of the overrunning clutch between the bell portion of the intermediary member and the driven shaft, in the same plane as the first and reverse selecting driven gear member, is largely responsible for the compactness enabled with this adaptation of an overrunning clutch compositely in a change speed gear set, and further is largely responsible for the simplification of means to accomplish reverse rotation of the driven transmission shaft beyond the overrunning clutch, with conventional gearing. Thus the advantage and usefulness of my present invention becomes more comprehensive.

Thus it will be seen that I have provided a simple, strong, light weight and comparatively inexpensive of production construction for obtaining transmission under all speeds selectively either free wheeling, or positive, which is in keeping with the highest standards of practice for obtaining the highest degree of mechanical efficiency, rigidity, gear alignment, silence of operation and reliability.

It will be understood that the embodiment of the invention as shown may be modified without departing from the spirit of the invention as recited in the appended claims.

I claim:

1. In a change speed transmission mechanism for motor vehicles, in combination with low speed and reverse gearing comprising aligned drive and driven shafts, a parallel countershaft having a low speed pinion and a reverse drive pinion fixed thereon, an idler gear in constant mesh with the reverse drive pinion, means for constantly operating the countershaft from the drive shaft, and a low speed and reverse selecting driven gear member for free mounting coaxial and in encircling relation to the driven shaft and disposed longitudinally between the low speed and idler gear members for selective gear mesh therewith; a revolvable sleeve adapted to carry a plurality of differentiating speed driven gear members, said sleeve being rotatively sleeved on the driven shaft, said sleeve having a bell shaped portion opening toward the driving end of the driven shaft, splines on the outer surface of the bell, the first and reverse selecting driven gear member having a splined internal diameter, said driven gear member being splined on the outer surface of said bell, said bell having a cylindrical interior, an overrunning clutch member mounted on said driven shaft to rotate therewith, said overrunning clutch having roller clutch members contacting the cylinder of said bell, said overrunning clutch being adapted to transmit rotation in one direction from said sleeve to said driven shaft but allowing for said driven shaft to over-run said sleeve, a slidable member splined on said driven shaft beyond said sleeve, said slidable member and said sleeve each having parts to be engaged to positively prevent relative rotation therebetween, said slidable member also having a splined surface adapted to be engaged by the splined internal diameter of the first and reverse selecting driven gear member, said slidable member being disposed and adapted to axial movements relatively with said idler gear member whereby the splines on said slidable member will be continuously in position for spline engagement by said first and reverse selecting driven gear member simultaneously with gear mesh engagement of said first and reverse selecting gear member with said idler gear member, means to shift said selecting driven gear member into mesh with said first speed pinion, said means also being operable to shift said selecting driven gear member into gear mesh with said idler gear member and into spline mesh with said slidable member, at the same time, to effect a positive reverse drive relation between said first and reverse selecting gear member and said driven shaft and not through the medium of said overrunning clutch, and means to shift said slidable member into positive engagement with said sleeve to supplant the overrunning drive couple of said overrunning clutch therebetween with a positive couple to effect a positive drive of other speed gears.

2. In motor vehicle transmission, a gear box, a drive shaft projecting into said gear box through one end, an aligned driven shaft projecting into said gear box through the opposite end and extending into journal engagement with said drive shaft, a sleeve rotatably mounted on the portion of said driven shaft within said gear box and intermediate the ends of said driven shaft, a coaxial driven gear member rotatively sleeved on said sleeve and in geared connection with said drive shaft, means for positively coupling said sleeve selectively either to said drive shaft or said driven gear member, said means including a clutch member disposed coaxially between said drive shaft and driven gear member and mounted nonrotatable on said sleeve, means actuated by said sleeve operating to drive said driven shaft in one direction and permit over-run of said driven shaft in the same direction under momentum of the latter, and means for optionally positively coupling said sleeve and driven shaft together.

3. In transmission mechanism, a drive shaft, a driven shaft axially aligned with said drive shaft and having its driven end in journal engagement therewith, a sleeve rotatably mounted on said driven shaft with its ends terminating intermediate the ends of said driven shaft, a driven gear rotatively sleeved on said sleeve and in geared connection with said drive shaft, a clutch member mounted nonrotatable on said sleeve coaxially intermediate said drive shaft and driven gear member, said clutch, drive shaft and driven gear each having parts to be engaged to positively prevent relative rotation therebetween, said clutch being adapted to be positively engaged selectively either with said drive shaft or driven gear member, means actuated by said sleeve operating to drive said driven shaft in one direction and permit over-run of said driven shaft in the same direction under momentum of the latter, a shiftable coupling member mounted nonrotatable but axially movable on said driven shaft relatively beyond said sleeve with respect to the driving end of said driven shaft, said coupling member and sleeve each having parts to be engaged to positively prevent relative rotation therebetween, and means to shift said coupling member into positive engagement with said sleeve.

4. The combination with aligned and contiguously related main transmission drive and driven shaft members, a coaxial driven gear member in encircling and rotatably independent relation to said driven shaft member, a clutch member coaxially disposed between said drive shaft and driven gear members for selective coupling engagement with either said drive shaft or driven gear member and in encircling and rotatably independent relation with said driven shaft member, and means for driving said driven gear member from said drive shaft at a different speed than the latter; of a sleeve shaped member rotatably mounted on said driven shaft member and interposed as an intermediary carrying bushing between said clutch and driven gear members and said driven shaft, said clutch being nonrotatably sleeved on said sleeve shaped member, said driven gear member being rotatably sleeved on said sleeve shaped member, means actuated by said sleeve shaped member operating to drive said driven shaft in one direction and permit over-run of said driven shaft in the same direction under momentum of the latter, and means for optionally locking said sleeve shaped member positively rotatable with said driven shaft.

5. In transmission mechanism, a drive shaft, a driven shaft aligned with said drive shaft and having its driven end in journal engagement therewith, a sleeve shaped member, said sleeve shaped member being rotatably sleeved on said driven shaft member with its ends terminating within the ends of the latter, means for driving said sleeve shaped member from said drive shaft at the same speed as, or at different speed than, said drive shaft, said sleeve shaped member having a bell shaped portion with the bell opening toward the driving end of said driven shaft, cams rotatable with said driven shaft and disposed thereon within the bell portion of said sleeve shaped member, roller clutch members between said cams and the bore of said bell and to be actuated by the bell portion of said sleeve shaped member to drive said driven shaft through the medium of said cams in one direction and permit over-run of said driven shaft in the same direction under momentum of the latter, a coupling member mounted nonrotatable but axially movable on said driven shaft, said sleeve shaped member and coupling member each having parts to be engaged to positively prevent relative rotation therebetween, and means to shift said coupling member into positive engagement with said sleeve shaped member to optionally supplant the overrunning drive couple between said sleeve shaped and driven shaft members with a positive drive couple therebetween.

6. The invention as set forth in claim 5 together with a driven gear mounted nonrotatable but axially movable on the outer surface of the bell shaped portion of said sleeve shaped member for selective engagement with one of two other gears.

7. In motor vehicle transmission mechanism, the combination of a drive shaft driven by the vehicle engine, a driven shaft for propelling the vehicle in aligned and in end to end relation to said drive shaft, a loose intermediary coaxial transmission member operatively interposed between said drive and driven shaft provided in the form of a sleeve being in encircling and rotatable relative sleeved relation to said driven shaft, an overrunning clutch operating to one-way drive connect said sleeve and driven shaft, and means for driving said sleeve from said drive shaft either at the same speed as, or at a different speed than, said drive shaft, including a gear mounted on said sleeve and gearing cooperating with said drive shaft and gear and a positive clutch mounted on said sleeve and engageable either with said drive shaft or gear for selectively coupling either said sleeve to turn either with said drive shaft or gear.

8. A variable speed ratio and variable speeds all one-way driving motor vehicle drive comprising, a drive shaft driven by the vehicle prime mover, an aligned driven shaft for propelling said vehicle, a sleeve in encompassing and rotatable relative relation to said vehicle propelling driven shaft, means for driving said sleeve from said drive shaft either as the same speed as, or at a different speed than, said drive shaft, said means including a driven gear rotatably mounted on said sleeve and in geared connection with said drive shaft and a positive clutch mounted directly on said sleeve and movable axially relative to said sleeve into and out of positions of positive engagement either with said drive shaft or said driven gear mounted on said sleeve for selectively coupling said sleeve to turn either with said drive shaft or said driven gear, and means driven by said sleeve and operating to drive said vehicle propelling driven shaft one-way drive connecting said sleeve and driven shaft.

9. In a motor vehicle transmission, a reduced speed effecting drive gear driven by the vehicle engine, a shaft out of line with said gear, a sleeve in encircling and rotatable relative relation to said shaft, an overrunning clutch, said sleeve actuating said overrunning clutch, said clutch operating to one-way drive said rotatable relative sleeve surrounded shaft, a driven gear mounted directly on said sleeve and cooperating with said reduced speed effecting gear, and means longitudinally movable, independently of said sleeve, into and out of a position in which a drive connection is established between said reduced speed effecting gear and sleeve through said driven gear.

10. In a motor vehicle transmission, in combination a reduced speed effecting drive gear driven by the vehicle engine, a driven shaft for propelling the vehicle axially parallel but out of line with said gear, a sleeve in encircling and rotatable relative relation to said driven shaft, an overrunning clutch actuated by said sleeve and operating to drive said shaft, a driven gear mounted rotatable on said sleeve and in constant mesh with said reduced speed effecting drive gear, and means including a coaxial positive clutch mounted non-rotatable but axially movable on said sleeve for establishing a positive drive coupling connection between said rotatable driven gear and said sleeve.

11. A variable speed ratio and all variable speeds one-way driving motor vehicle drive comprising, a drive shaft, an aligned driven shaft, a sleeve in encompassing and normally in rotatable relative relation to said driven shaft, means for driving said sleeve from said drive shaft at the same speed as said drive shaft including a positive clutch movable axially relative to said sleeve to establish a coupling of said sleeve with said drive shaft, means for driving said sleeve from said drive shaft at a different speed than said drive shaft comprising interengageable elements one of which is a driven gear in encircling relation to said sleeve and gearing cooperating with said interengageable elements and said drive shaft, and means one-way drive connecting said driven shaft and said sleeve.

12. In a transmission mechanism, a drive shaft, a driven shaft aligned therewith, a countershaft parallel to said drive and driven shafts, gearing connecting said drive and counter shafts, said driven shaft having its driven end in journal engagement with said drive shaft, a spool shaft rotatably sleeved on said driven shaft with its driven end contiguous to said drive shaft, an overrunning clutch operatively interposed between the driving end of said spool shaft and said driven shaft for driving said driven shaft from said spool shaft in one direction and permitting over-run of said driven shaft in the same direction under momentum of the latter, means including an axially shiftable positive clutch axially movable independently of said spool shaft, coaxially disposed contiguous with the driven end of said spool shaft and the driving end of said drive shaft and operable to establish a positive coupling connection between said drive and spool shafts, and means including a driven gear element carried on said spool shaft for driving said spool shaft from said drive shaft through the medium of said countershaft and at a different speed than said drive shaft.

13. A motor vehicle variable speed ratio and selective all speeds one-way or two-way drive transmission mechanism composed of a drive shaft driven by the vehicle prime mover, a driven shaft aligned with said drive shaft for propelling said vehicle, a plurality of gear trains all of which are in driven operative relation with said drive shaft and each one of which includes a driven gear element in coaxial and encircling relation to said driven shaft; a sleeve for carrying said driven gear elements of said plurality of gear trains in encircling and normally in rotatable relative relation to said driven shaft, said sleeve being loosely mounted on said driven shaft, each of said driven gear elements of said plurality of gear trains being mounted on said sleeve, each one of said plurality of gear trains provided with interengageable elements for operatively connecting said train to drive said sleeve from said drive shaft; a device actuated by said sleeve and operating to drive said driven shaft in one direction and permit over-run of said driven shaft in the same direction under momentum of the latter, and means movable into and out of a position in which said driven shaft is prevented from over-running in the driving thereof through said sleeve.

14. In a motor vehicle variable speed ratio transmission mechanism gear box forming a single compartment, a drive shaft driven by the vehicle prime mover and projecting into said compartment, a driven shaft for propelling said vehicle, aligned with said drive shaft and projecting into said compartment, a sleeve disposed within said compartment and mounted loosely on said driven shaft, a constant meshing gear train in said compartment and comprising a drive element actuated by said drive shaft and a driven element rotatably mounted on said sleeve for driving said sleeve from said drive shaft at a different speed than, said drive shaft, intermeshable means for operatively connecting said train to drive said sleeve from said drive shaft, intermeshable elements for directly coupling said sleeve and drive shaft together, and a device in said compartment, actuated by said sleeve and operating to drive said driven shaft in one direction and permit over-run of said driven shaft in the same direction under momentum of the latter.

15. In transmission mechanism, aligned main drive and driven shafts, a member adapted to be driven from said drive shaft either at the same speed as, or at a different speed than, said drive shaft, respectively, by positive operating connection with said drive shaft either directly or indirectly, said member consisting of a sleeve loosely mounted on said driven shaft, a device actuated by said sleeve and operating to drive said driven shaft in one direction and permit over-run of said driven shaft in the same direction under momentum of the latter, means including a clutch positively engageable with said drive shaft and nonrotatably mounted independently longitudinally shiftable on said sleeve for direct drive connecting said sleeve and drive shaft, and means including a driven gear member mounted on said sleeve and gearing cooperating with said driven gear member and said drive shaft and intermeshable elements for operatively connecting said sleeve and driven gear member thereon and cooperating gearing and drive shaft into a transmission train for operating said sleeve at reduced speed relative to said drive shaft.

16. A variable given direction speed ratio selective all given speeds one-way or two-drive transmission comprising, a drive shaft driven by the vehicle prime mover, a driven shaft for propelling said vehicle aligned with said drive shaft, a parallel countershaft, gearing in constant mesh connecting said countershaft and drive shaft, a sleeve loosely mounted on said driven shaft, an overrunning clutch disposed contiguous with the driving end juncture of said sleeve with said driven shaft, said sleeve actuating said overrunning clutch, said overrunning clutch operating to drive said driven shaft in one direction and permit over-run of said driven shaft in the same direction under momentum of the latter, a drive gear fixed on said countershaft, a driven gear loosely mounted on said sleeve and in constant mesh with said drive gear on said countershaft, means for coupling said sleeve either to said drive shaft or said driven gear thereon, said means including a longitudinally shiftable clutch mounted nonrotatable on the driven end of said sleeve and positively engageable with either said drive shaft and driven gear, a second driven gear mounted on said sleeve relatively between the first-referred-to driven gear and the overrunning clutch, a second drive gear mounted on said countershaft and cooperating with said second driven gear, means for rendering the cooperating said second drive and driven gears operative to drive said sleeve from said countershaft, and means movable into and out of a position in which said driven shaft is prevented from overrunning in the driving thereof through said sleeve.

17. In a motor vehicle power transmission which includes a drive shaft driven by the vehicle prime mover, a driven shaft for propelling said vehicle and aligned with said drive shaft, an over-running clutch operating to one-way drive said driven shaft, a longitudinally shiftable positive clutch for operatively connecting a direct drive train or a gear drive train to drive said driven shaft through said overruning clutch, said positive clutch being coaxial with and operatively between said drive and driven shafts, a driven gear element of an intermediate reduced speed effecting gear train coaxial with said driven shaft and driven from said drive shaft and engageable by said positive clutch, a driven gear element of a low reduced speed effecting gear drive coaxial with said driven shaft, to be driven from said drive shaft and adapted to be rendered operative to drive said driven shaft through said overrunning clutch; the means for mounting said direct and gear drive connecting train clutch and intermediate reduced speed effecting gear drive driven gear element and low reduced speed effecting gear drive driven gear element all in encircling and rotatable relative relation to said driven shaft and facilitating the driven end of said driven shaft being mounted in end to end or in journal engagement with said drive shaft and facilitating the direct and intermediate and low reduced speed effecting gear drives all to drive said driven shaft through said overrunning clutch comprising, a sleeve loosely mounted on said driven shaft and to actuate said overrunning clutch, said positive clutch being nonrotatably mounted on said sleeve, said driven gear element of said intermediate reduced speed effecting gear drive being mounted rotatable on said sleeve, said driven gear element of said low reduced effecting gear drive being mounted on said sleeve; and means for rendering said low reduced speed effecting driven gear element operative to drive said sleeve from said drive shaft.

18. In a motor vehicle variable speed ratio-transmission which includes a drive shaft driven by the vehicle prime mover, a driven shaft for propelling said vehicle and aligned with said drive shaft, a driven gear in encircling and rotatable relative relation to said driven shaft, gearing cooperating with said driven gear and said main drive shaft for driving said driven gear from said drive shaft at a different speed relative to said drive shaft, and an overrunning clutch for inputting rotation to said driven shaft; means for transmitting rotation either from said drive shaft to said driven shaft through said overrunning clutch at the same speed as said drive shaft or for transmitting rotation from said driven gear to said driven shaft through said overrunning clutch at the same speed as said driven gear, said means including a tubular shaped member rotatively sleeved on said driven shaft and upon which said driven gear is rotatably mounted, said tubular member operating as a driver to said overrunning clutch, and said means also including a positive clutch mounted nonrotatable on said tubular member relatively between said driven gear on said tubular member and said drive shaft and longitudinally shiftable into positive engagement either with said drive shaft or said driven gear for selectively coupling said tubular member to turn either with said drive shaft or said driven gear.

19. A motor vehicle variable speed ratio and selective all speed ratios one-way or two-way drive transmission comprising, a drive shaft driven by the vehicle prime mover, a driven shaft for propelling said vehicle aligned with said drive shaft, a countershaft parallel to said drive and driven shafts, constant mesh gearing connecting said drive and counter shafts, a tubular shaft rotatively sleeved on said driven shaft, an overrunning clutch one-way drive connecting said tubular and driven shafts, an intermediate reduced speed effecting driven gear rotatably mounted on said tubular shaft, a gear fixed on said countershaft and in constant mesh with said driven gear, means including a positive clutch mounted nonrotatable but axially movable on said tubular shaft between said driven gear on said tubular shaft and the drive shaft, said positive clutch being engageable either with said drive shaft or said driven gear for selectively positively coupling one of said drive shaft and driven gear members to drive said tubular shaft, means for low reduced speed driving said tubular shaft from said countershaft including interengageable elements one of which being another driven gear mounted on said tubular shaft, and means movable into and out of a position in which said driven shaft and said tubular shaft mounted thereon are two-way drive connected.

20. In transmission mechanism, aligned drive and driven shafts, a gear driven from said drive shaft, at a different speed than, said drive shaft, and disposed in encircling and rotatable relative relation to said driven shaft, a one-way clutch operating to drive said driven shaft, means for connecting either said drive shaft or gear to drive said driven shaft through the medium of said one-way clutch, said means including a positive clutch having a hub in encircling and rotatable relative relation to said driven shaft and actuating said one-way clutch, and having a collar to turn with and encircling and axially movable relation to said hub and positively engageable with either said drive shaft or gear, and said driven gear being rotatably mounted on said clutch hub.

In testimony whereof I affix my signature.
EVERETT R. BURTNETT.